(12) United States Patent
Howarth (10) Patent No.: US 11,577,851 B2
(45) Date of Patent: Feb. 14, 2023

(54) AIR INTAKE COVER

(71) Applicant: MBDA UK LIMITED, Stevenage (GB)

(72) Inventor: Anthony James Howarth, Stevenage (GB)

(73) Assignee: MBDA UK Limited, Stevenage (GB)

( * ) Notice: Subject to any disclaimer, the term of this patent is extended or adjusted under 35 U.S.C. 154(b) by 220 days.

(21) Appl. No.: 16/770,688

(22) PCT Filed: Nov. 27, 2018

(86) PCT No.: PCT/GB2018/053416
§ 371 (c)(1),
(2) Date: Jun. 8, 2020

(87) PCT Pub. No.: WO2019/110958
PCT Pub. Date: Jun. 13, 2019

(65) Prior Publication Data
US 2021/0163145 A1 Jun. 3, 2021

(30) Foreign Application Priority Data

Dec. 7, 2017 (GB) ...................................... 1720377
Jan. 16, 2018 (EP) ...................................... 18151822

(51) Int. Cl.
*B64D 33/02* (2006.01)
*F42B 15/10* (2006.01)
*F02C 7/042* (2006.01)

(52) U.S. Cl.
CPC .............. *B64D 33/02* (2013.01); *F02C 7/042* (2013.01); *F42B 15/10* (2013.01); *B64D 2033/0253* (2013.01)

(58) Field of Classification Search
CPC . B64D 33/02; B64D 2033/0253; F02C 7/042; F42B 15/10
USPC .......................................................... 415/121
See application file for complete search history.

(56) References Cited

U.S. PATENT DOCUMENTS

| | | | | |
|---|---|---|---|---|
| 2,362,552 A | * | 11/1944 | Heymann | B64D 33/02 454/76 |
| 3,659,424 A | * | 5/1972 | Polk, Jr. | B64D 33/02 60/245 |
| 4,121,606 A | * | 10/1978 | Holland | B64D 33/02 137/15.1 |
| 6,142,417 A | * | 11/2000 | Figge, Sr. | B64D 33/02 137/15.1 |

(Continued)

OTHER PUBLICATIONS

International Preliminary Report on Patentability and Written Opinion dated Jun. 9, 2020 issued in PCT/GB2018/053416.

(Continued)

*Primary Examiner* — Samir Abdosh
(74) *Attorney, Agent, or Firm* — Scully, Scott, Murphy & Presser, PC (57) ABSTRACT

A cover for an intake of an air-breathing engine in a missile is disclosed. The cover comprises a motive arrangement operable to move from a first configuration in which the cover is lockable to a missile, to a second configuration in which the cover is pushed outwardly from the missile. In the first configuration, the surface of the cover is flush with the surface of the missile and the motive arrangement is located inwardly of the cover surface. A missile provided with such a cover is also disclosed.

19 Claims, 5 Drawing Sheets

(56) References Cited

U.S. PATENT DOCUMENTS 6,880,780 B1 * 4/2005 Perry ..................... F42B 10/14
244/49

OTHER PUBLICATIONS

International Search Report and Written Opinion dated Jan. 28, 2019 issued in PCT/GB2018/053416.
GB Search Report dated Mar. 22, 2018 issued in GB 1720377.9.
EP Search Report dated Jan. 2, 2018 issued in EP 18151822.

* cited by examiner

AIR INTAKE COVER

FIELD OF THE INVENTION

This invention relates to an air intake cover, and particularly to an air intake cover for the intake of a missile air-breathing engine.

BACKGROUND ART

Missiles for launch from aircraft typically spend some time in storage and transit prior to being loaded onto an aircraft-mounted launcher, following which they will spend some time in air carriage on the aircraft prior to a possible launch. Subsequent to launch, the missile is propelled by its own engine, which may for example be either a rocket-type engine, or an air breathing engine. In the latter case, the missile will be provided with one or more air intakes. It is known to provide air intake covers to prevent ingress of environmental debris prior to launch of the missile.

These covers must be removed from the air intakes before the engines can begin to operate, and it is known to provide ejection mechanisms that operate to eject the cover from the missile on or shortly after launch. During storage and transit of the missile it is possible for the covers to become lightly stuck to the missile surface as a result of the accumulation of dirt; and it is known that ice can form around the interface between the cover and the missile during air transit. Since the missile's engine will not function without the air intakes being open, it is important that the ejection mechanisms are reliable and will operate with sufficient force to break through any sticking resulting from accumulation of dirt, or from the formation of ice.

Since launchers are often already present on aircraft onto which missiles are to be loaded it is not generally desirable to need to adapt the launcher in order to accommodate a cover ejection mechanism; and it is also desirable not to extend the space required by the missile in transit. Moreover, space within the missile itself is also limited and most normally taken up by internal components providing desired functionality to the missile, or by fuel needed in order to meet a desired range for the missile. Air intake covers, and their associated ejection mechanisms, must therefore be designed with these competing constraints in mind, whilst still ensuring a reliable and consistent ejection operable after some time in storage.

SUMMARY OF THE INVENTION

In a first aspect the invention provides a cover for an intake of an air-breathing engine in a missile, the cover comprising a motive arrangement operable to move from a first configuration in which the cover is lockable to a missile, to a second configuration in which the cover is pushed outwardly from the missile; wherein in the first configuration the surface of the cover is flush with the surface of the missile and the motive arrangement is located inwardly of the cover surface. By providing the motive arrangement inwardly of the cover, the above described constraints are met in a particularly efficient way.

The motive arrangement may comprise an actuator operable to move the motive arrangement from the first configuration to the second configuration. The actuator can then be operated after a suitable delay once the missile has been launched.

The motive arrangement may comprise a linkage mechanism, and the linkage mechanism, in the first configuration, may be extended in a first direction such that the cover, in use, is locked onto the missile, and in the second configuration, the linkage mechanism may be contracted in the first direction such that the cover is removable from the missile.

The motive arrangement may be configured, when moving from the first configuration to the second configuration, to move through an intermediate configuration in which the cover is removable from the missile but is not pushed outwardly from the missile. In this manner the motive arrangement is contracted in the first direction, and therefore made removable from the missile, before any outward push from the missile occurs. This is expected to assist in the mitigation of any risk of the mechanism jamming, for example because the outward push may increase the friction encountered when the motive arrangement contracts. This may occur in particular if parts of the motive arrangement are pushed against the parts of the missile with which they interact in order to lock the cover in place prior to the contracting motion.

In use of the cover on a missile, it will be appreciated that the cover will be removed whilst the missile is in flight, shortly after launch. The cover may further comprise a hook structure arranged such that, when fitted to the air intake, the hook structure co-operates with the lip of the air intake so as to form a pivot about which the cover rotates as it is pushed outwardly from the missile. As it pivots the forward part of the cover, at the opposite end to the hook structure, moves into the airflow around the missile which then acts to lift the cover away from the missile.

The motive arrangement may further comprise a cam and follower mechanism arranged to push the cover outwardly from the missile when the motive arrangement as the motive arrangement is moved to the second configuration. The cam and follower mechanism provide a compact way of providing the motive arrangement within the confined space of an air intake.

The actuator may comprise a linear actuator that is operable to extend in a second direction, so as to move the motive arrangement from the first configuration to the second configuration. The cam may comprise a sliding cam provided on a linear push rod on which the linear actuator operates. In one embodiment, the first direction is generally perpendicular to the second direction. The second direction may be generally parallel to the missile axis.

The linkage mechanism may comprise a locking arm arranged to retract in the first direction when the motive arrangement moves from the first configuration to the second configuration.

The cover may further comprise a sealing ring arranged such that, when the cover is in place on the missile, the sealing ring is located around the intake so as to seal the intake from the external environment. The sealing ring prevents the ingress of environmental debris into the air intake.

The cover may further comprise means to hold the motive arrangement in the first configuration. The means may for example comprise a frangible shear pin configured to break on operation of the actuator. Holding the motive arrangement in place ensures that the cover stays in place until the time at which it is necessary to remove it.

The actuator may be a pyrotechnic actuator. Pyrotechnic actuators are one example of actuators that can be used to provide sufficient force to break the shear pin, if it is present, break through any icing or other seal sticking, and push the cover through any aerodynamic forces that may act, in flight of a missile, to hold the cover against the missile body.

The cover may further comprise means to receive a signal from the missile so as to cause operation of the actuator. In this way the processing means to determine the point at which the cover should be ejected can be incorporated within the missile, rather than requiring the processing to be incorporated within the cover itself.

The cover may further comprise a ballast weight arranged such that the centre of gravity of the cover is located towards the front of the cover. As is described in more detail below, with respect to an exemplary embodiment, this enables a more predictable trajectory of the cover away from the missile subsequent to its ejection.

The invention extends to a missile having an air-breathing engine and an intake for the air-breathing engine, the missile comprising a cover as described above covering the intake, the cover being in the first configuration such that the surface of the cover is flush with the surface of the missile and the motive arrangement is located within the intake, wherein the cover is in communication with the missile such that, on receipt of a signal from the missile, the cover moves to the second configuration and is ejected from the missile.

The air intake of the missile may be provided with means arranged to co-operate with the cover such that the cover can be locked to the missile in the first configuration. The means may for example comprise slots arranged to receive the locking arm.

BRIEF DESCRIPTION OF THE DRAWINGS

Embodiments of the invention will now be described by way of example only and with reference to the accompanying drawings, of which.

DETAILED DESCRIPTION

FIGS. 1 to 5 schematically illustrate an ejectable cover 100 for an air intake on a missile having an air breathing engine. Throughout the Figures, like parts are given like reference numerals. The cover is self-contained, in that the mechanism used to eject the cover from the missile is entirely contained within the cover itself, requiring no connection to a launcher, or to the vehicle carrying the missile. As is shown in FIGS. 1a and 1b, cover 100 fits over the air intake of a missile body tube 10, so that, when locked in place on the missile body tube 10, the cover 100 is substantially flush with the surface of the missile body tube 10, sealing it from ingress of environmental debris; and so that the ejection mechanism, contained in housing 120, is within the detent 12 in the missile body tube 10 that leads to the air intake 14. In this way the cover 100 does not require any outward expansion of the space required for storage or transit of the missile. In addition, since the cover 100 uses only space within the air intake that would otherwise remain unused, there is only very limited reduction in the space available for other missile components.

Figure 1A:
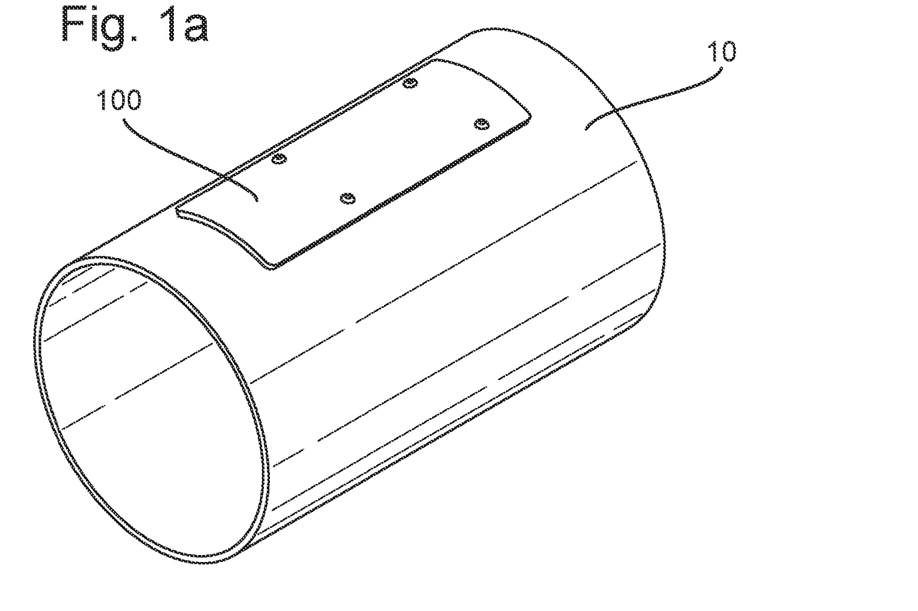
FIGS. 1a and 1b are, respectively, schematic diagrams of an air intake cover in accordance with a first embodiment of the invention in position on a missile body tube, and in exploded form illustrating the fit of the cover into the air intake on the missile body tube.
Figure 1B:
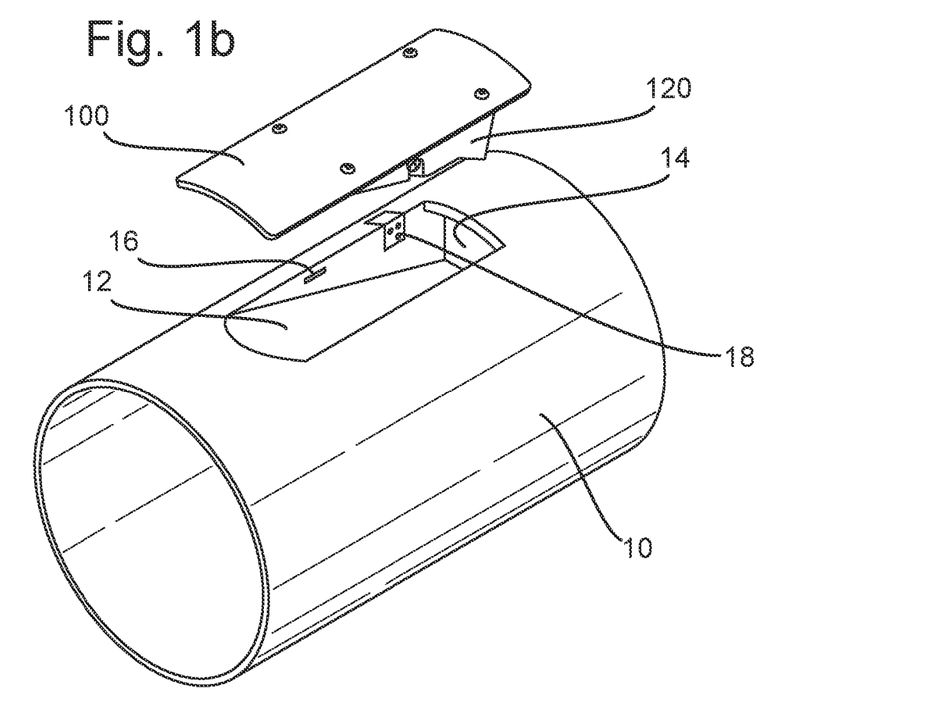

The missile body tube 10 is provided with cavities 16 to receive locking arms (described in further detail below) of the cover which act to lock the cover in place on the missile when it is in transit, as is shown in FIG. 1b. In the locked position, the cover 100 can be held against the missile body tube with some positive pressure such that a compressive seal acts to seal the air intake against the ingress of any moisture or dirt during storage of the missile, or during air carriage. The missile body tube is also provided with a connector 18 to enable a signal to be passed to the cover, via a corresponding connector (described in further detail below) on the cover 100 to actuate the ejection mechanism once the missile has been launched.

Figure 2:
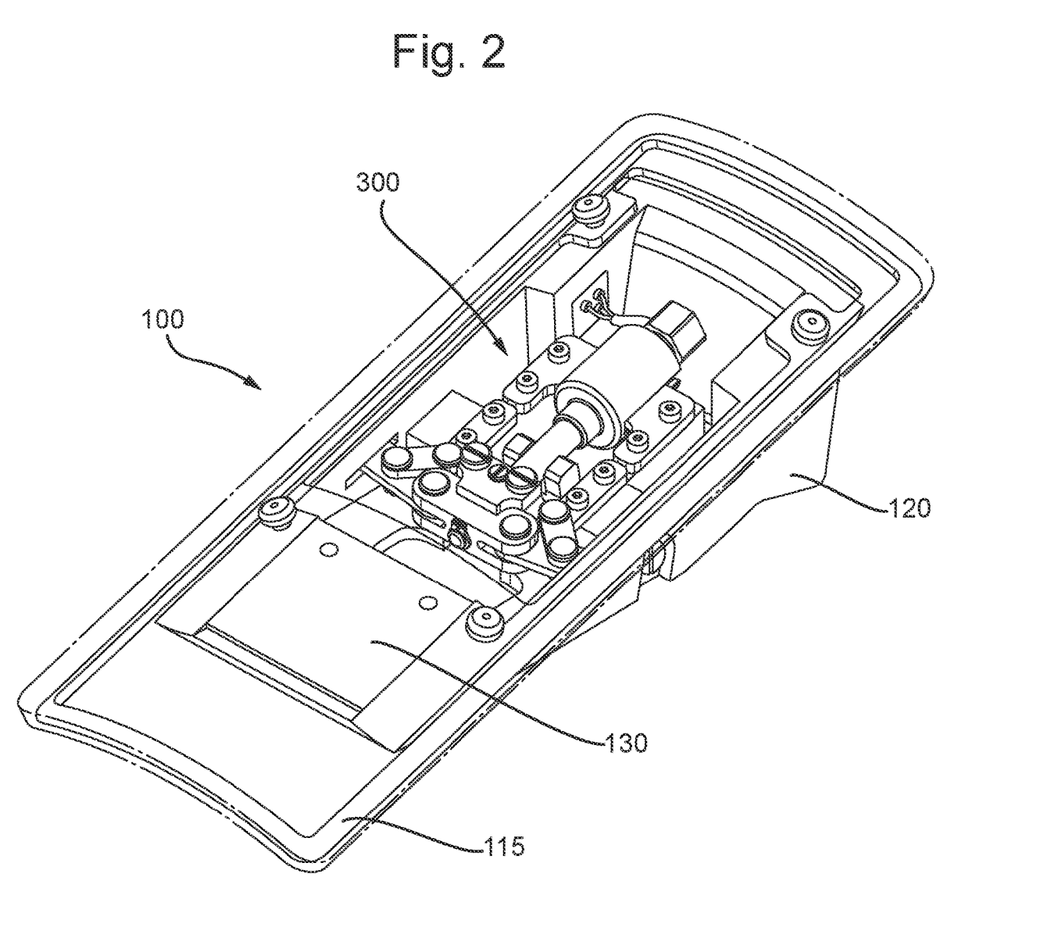
FIG. 2 is a schematic diagram showing the component parts of the air intake cover of FIG. 1 in further detail.

The component parts of the cover 100 are shown in further detail in FIG. 2, which is a schematic illustration of the cover in which its outer (with respect to the missile body tube) surface is rendered transparent. The outer surface is of generally rectangular form, elongate in the dimension to be aligned, in use, with the missile axis, and corresponds generally to the shape of the detent in the missile body tube. The motive parts 300 of the cover, which operate to eject the cover 100 from the missile 10, are located beneath (as shown) this outer surface, and contained in a wedge-shaped housing 120. The wedge has its thicker end towards the air intake, and a gradually tapering profile that is designed to correspond with the profile of the detent in the body tube of the missile with which the cover is intended to be used. The outer surface extends to provide a seal retaining lip 115 for holding a seal made from a material, such as a rubber, that can be compressed against the missile body tube closely adjacent the detent for the air intake. Towards the narrow end of the wedge a ballast weight 130 is provided. On ejection of the cover from the missile, it is important that the cover does not collide with any other parts of the missile or with the aircraft from which the missile has been launched. The provision of the ballast weight 130 makes the trajectory of the cover 100 after ejection more predictable, for example through suitable aerodynamic modelling.

Figure 3:
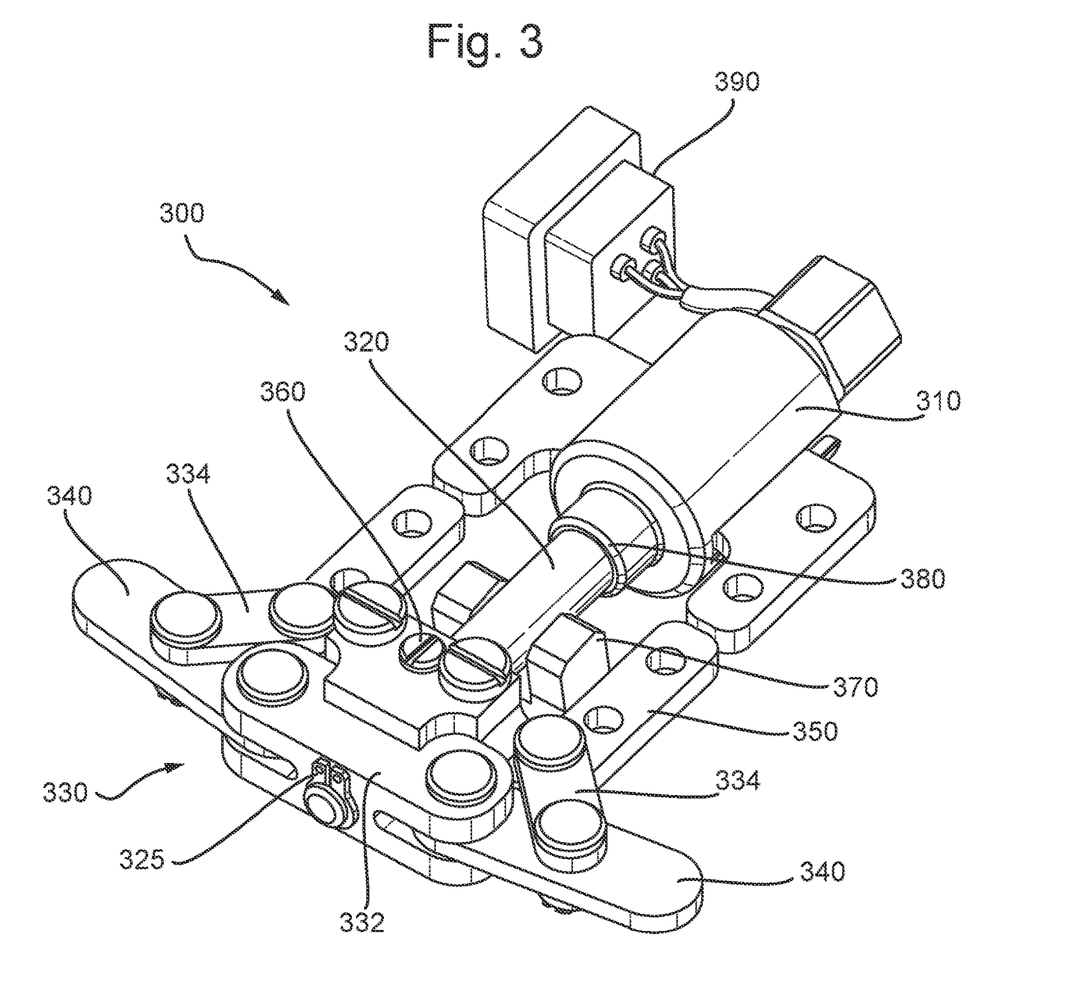
FIG. 3 is a schematic diagram showing the component parts of the air intake cover of FIG. 1 in further detail.

The motive assembly 300 of the cover mechanism are illustrated in FIG. 3. In the present embodiment the ejection of the cover 100 is initiated by a pyrotechnic actuator 310 located at the air intake end of the motive assembly. The pyrotechnic actuator operates to move a push rod 320 aligned with the missile axis in a direction parallel to the missile axis, and away from the air intake. At its opposite end, push rod 320 is connected to a linkage mechanism, indicated generally at 330 and described further below, which in the present embodiment is a form of scissor linkage, which connects with locking arms 340. The components of the motive assembly 300 are held in place by means of a retaining structure 350. The retaining structure 350 can be further arranged to constrain the movements of the push rod on operation of the pyrotechnic actuator, for example by providing holes through which the push rod 320 moves, and by the provision of slots co-operating with projections on the push rod 320 itself.

The linkage mechanism is shown in FIGS. 2 and 3 in a first configuration in which locking arms 340 are extended perpendicularly outward from the motive assembly. As can be seen in FIG. 2, in this configuration the locking arms 340 extend outwardly from slots formed in the housing of the cover 100, and, in use, into the slots 16 in the missile body described above with reference to FIG. 1. A shear pin 360 passing through the retaining structure and the push rod holds the motive assembly in this first configuration, preventing the locking arms from retracting as a result of vibration or other motions prior to launch of the missile.

Linkage mechanism 330 includes a coupler linkage 332 attached to the push rod 320 by a circlip 325. The coupler linkage 332 extends perpendicularly to the push rod 320 and, at its opposing ends, is pivotally connected to locking arms 340. The locking arms 340 are further connected to the retaining structure 350 by links 334. Each link is pivotally connected to the retaining structure 350 and to a point approximately midway along its respective locking arm 340 so that, in the extended, locked configuration, the ends of the locking arms project beyond the pivot point, through slots in the cover housing, and, in use, into the missile body. The dimensions and geometry of the linkage mechanism will be determined to fit with the dimensions of the missile with which the cover is to be used.

The motive assembly 300 also includes a rotational follower 370, which cooperates with a sliding cam 380. Rotational follower 370 is described in further detail below with reference to FIGS. 5a to 5c, but in brief its function is to push the cover 100 upwards on operation of the actuator, so that the cover is lifted into the airstream around the missile and thus removed from the air intake. The ballast weight 130, illustrated in FIG. 1, is selected to have a mass that moves the centre of gravity of the cover 100 to the fore of the rotational follower. This aids predictable dispersion of the cover subsequent to ejection, and improves the likelihood of a satisfactory trajectory of the cover after ejection.

Also illustrated in FIG. 3 is connector 390. Connector 390 communicates with the connector 18 on the missile body, and is electrically connected to the pyrotechnic actuator 310. This connection enables a signal to be passed to the pyrotechnic actuator so as to eject the cover 100 from the missile a suitable time after launch. The connection between the cover 100 and the missile is arranged so as not to impede in any significant way the ejection of the cover. In the present embodiment the connector 390 comprises three spring-loaded pins which, when in place on the missile, are pushed against the corresponding connector 18 on the missile air intake wall.

Figure 4A:
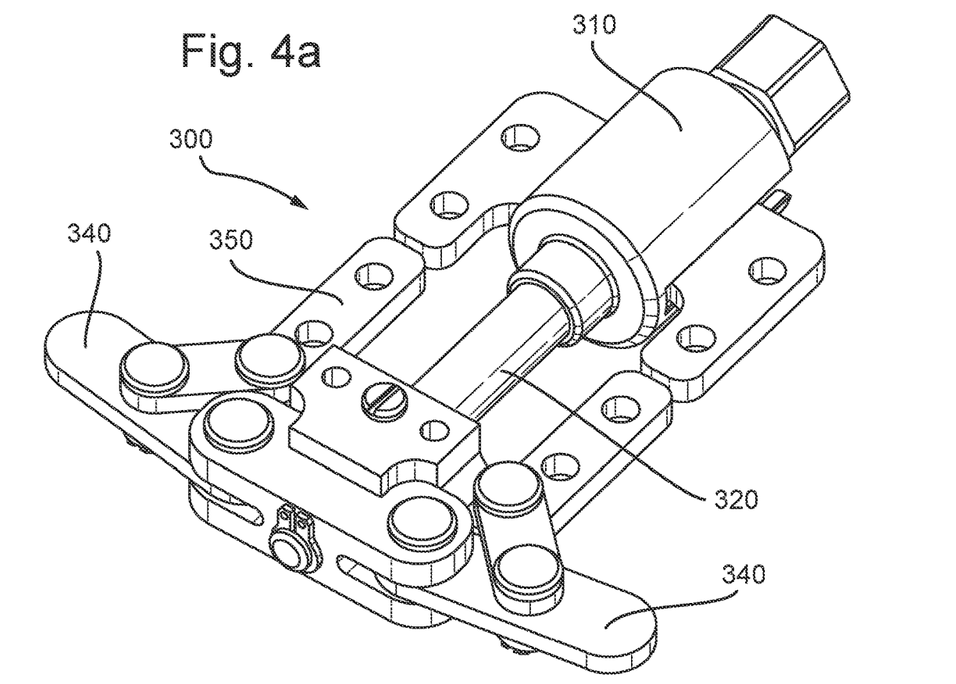
FIGS. 4a and 4b are schematic diagrams showing the motive parts of the air intake cover ejection mechanism of FIG. 1 in, respectively, a first, extended configuration, and a second, retracted position.
Figure 4B:
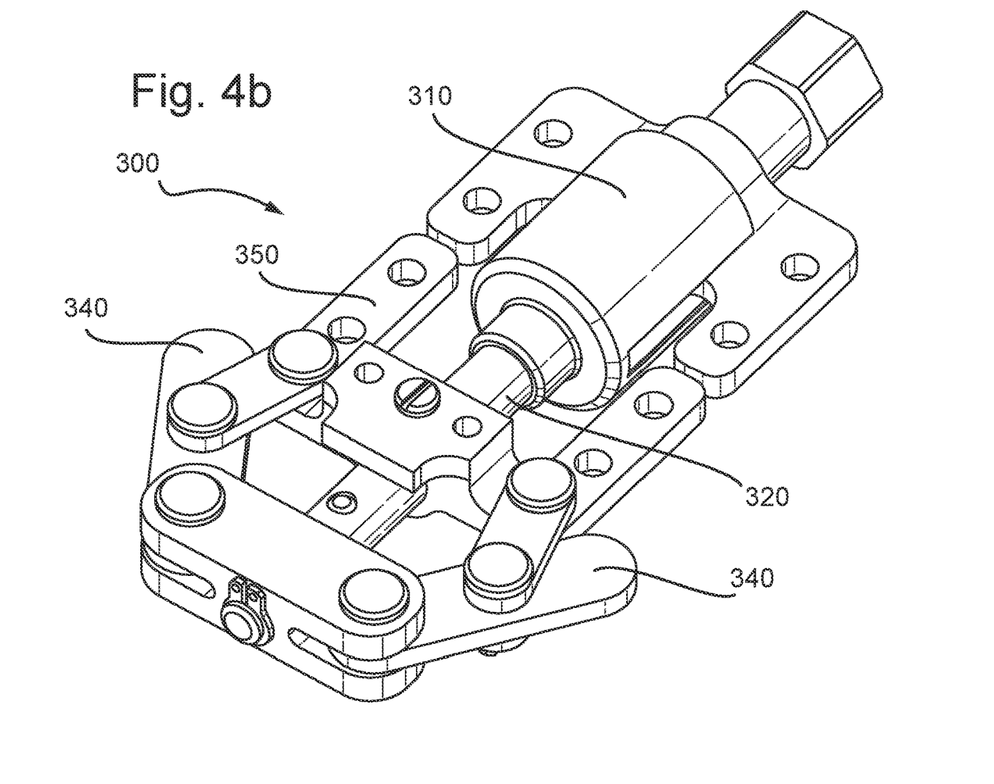

FIGS. 4a and 4b show the locking parts of the motive assembly in their extended configuration and retracted configuration respectively. As will be seen, FIG. 4a is similar to FIG. 3, except in that certain parts of the motive assembly, such as the connector and the rotational follower, are not shown for clarity. In FIG. 4b, the push rod 320 is extended forwards and the locking arms 340 are thus retracted. The push rod is moved forwards by operation of the pyrotechnic actuator 310, constrained to linear motion as described above by means of the retaining structure 350. The pyrotechnic actuator operates with sufficient force to break the shear pin, freeing the push rod to move constrained only by the retaining structure 350. As it moves forward the coupler linkage is also pushed forwards, and the retraction of the locking arms occurs as a result of this forward movement in combination with their second pivot to links attached to the retaining structure. In the retracted configuration both the locking arms and the links are parallel to the missile axis, and the locking arms will no longer extend into the slots in the missile body, such that the cover 100 is free to lift away from the missile.

The actual forces needed to operate the ejection mechanism will vary in dependence on the particular missile with which the cover is to be used and it will be appreciated that testing of the cover mechanism for any particular application will enable relevant parameters to be determined. However by way of example it is envisaged that using a pyrotechnic actuator supplying a peak thrust of 2 kN will be suitable, in combination with a shear pin designed to fail at around 280N to 500N, to eject a cover given typical expected levels of friction (for example between the locking arms and the cavities in the air intake wall, amplified as a result of the need to compress the seal around the cover), aerodynamic loading, and any seal sticking due to accumulated dirt or icing. Notably the thrust generated by the pyrotechnic actuator will decay with extension, and this effect must also be taken into account in any modelling done prior to any physical testing of the cover ejection mechanism.

Figure 5A:
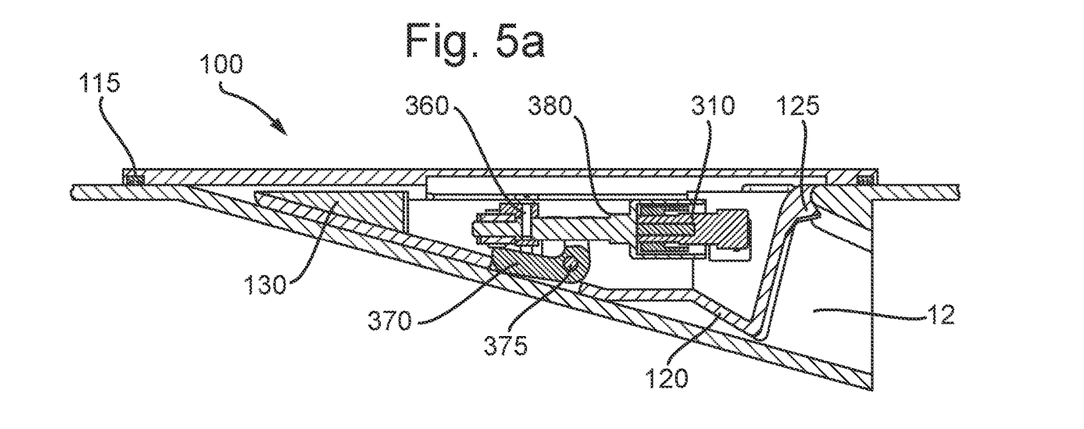
FIGS. 5a to 5c illustrate stages in the movement of the air intake cover ejection mechanism of FIG. 1 from the extended configuration to the retracted configuration.
Figure 5B:
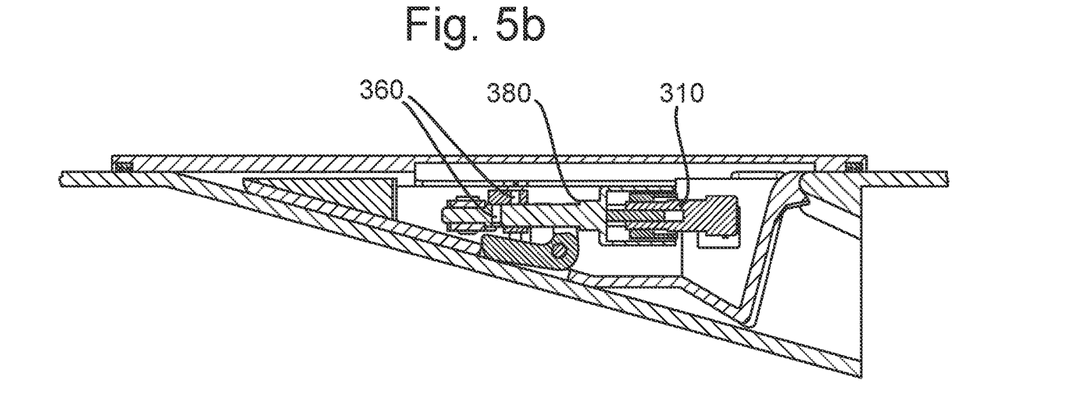
Figure 5C:
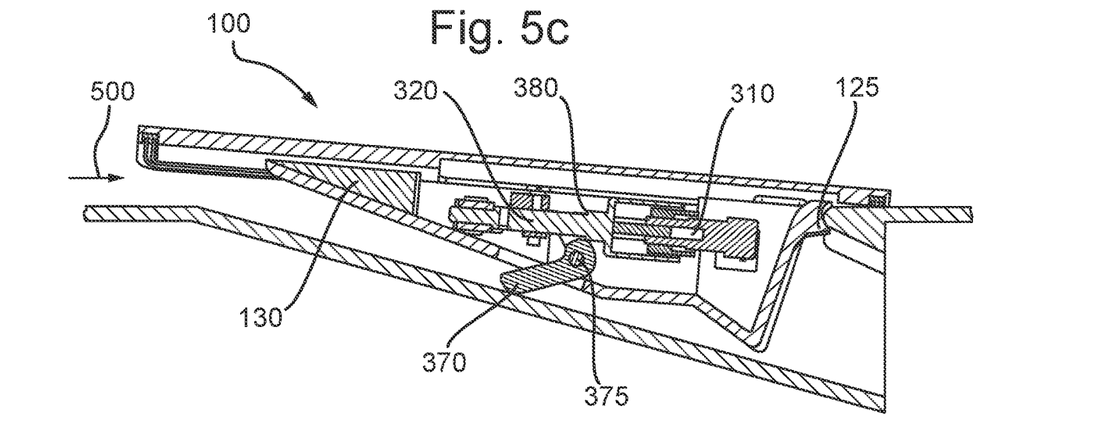

FIGS. 5a to 5c illustrate the operation of the ejection mechanism from an alternative perspective, showing in particular the motion of the rotational follower 360 and the consequential outward motion of the cover 100. FIG. 5a illustrates the cover in locked position within the detent 12 formed by a missile air intake. It will be seen that cover housing 120 includes a hook structure 125 which, in locked position on the missile, cooperates with the lip of the air intake so as to form a pivot point about which the cover can rotate as it is ejected. The motive assembly with the pyrotechnic actuator is shown in cross-section. In particular rotational follower 370 is seen, in FIG. 5a, aligned with the surface of the detent 12 formed in the missile body tube, and attached to the retaining structure of the motive assembly at pivot 375. Sliding cam 380 in FIG. 5a is in its retracted position, some distance away from the rotational follower 370. In the present embodiment this distance is approximately 5 mm.

FIG. 5b shows an intermediate stage after operation of the pyrotechnic actuator 310. In this intermediate stage the shear pin 360 has been broken and the sliding cam 380 has moved forwards but has not yet contacted the rotational follower 370. It will be appreciated that this enables the functions of breaking the shear pin, retraction of the locking arms, and the pivoting of the rotational follower are separated. In this configuration the locking arms (not shown in FIGS. 5a to 5c) are retracted sufficiently to be removed from the cavities in the missile body tube, as a result of the motion of the push rod acting on the linkage mechanism, as described above, so that the cover mechanism is free to move away from the missile air intake before the sliding cam contacts the rotational follower. This assists in preventing jamming.

FIG. 5c shows the cover after the motion of the pyrotechnic actuator 310 is complete. In the present embodiment the actuator 310 causes the push rod 320 to move forwards by approximately 10 mm. It will be seen that the sliding cam 380 has now made contact with the rotational follower 370 and pushed its upper (as shown) portion forwards, causing it to rotate about pivot 375 and push downwards on the missile body. This results in the cover 100 being pushed upwards. However, it remains partially held in the air intake as a result of the hook structure 125 which still cooperates with the lip of the air intake. This now forms a pivot point about which the cover mechanism rotates as a result of the upward push resulting from the action of the rotational follower 370.

The hook structure ensures that it is the forward part of the cover that is pushed upwards. As illustrated by arrow 500 in FIG. 5c, this ensures that the cover is caught by the airflow past the missile, in turn creating sufficient force to entirely remove the cover 100 from the missile. By providing the ballast weight 130 towards the opposite end of the ejection mechanism to the hook structure at the air intake the centre of gravity of the cover 100 is moved forwards. The force of the air flow can be considered as acting on the cover at its centre of gravity, and it will now be seen that moving the centre of gravity reduces the moment created by the air flow about the pivot. In turn this reduces the likelihood of the cover tumbling away from missile in an unpredictable manner. Instead it is made more likely that the front of the cover lifts only slightly before the whole cover is lifted away from the missile. It will be appreciated that the rotational follower need only lift the forward part of the cover 100 by an amount sufficient to move it outside of the boundary layer around the missile, so as to ensure it encounters the full force of the airflow.

It will be appreciated that variations and modifications to the above-described embodiment are possible without departing from the spirit and scope of the invention, which is defined in the accompanying claims. Further equivalents may be obvious to those skilled in the art. For example, it may be possible to use alternative mechanical means to the cam and follower mechanism used to push the cover outwardly from the missile, such as by enabling the wedge-shaped ballast mass to move, on operation of the actuator, away from the intake so as to push into the detent and thereby push the cover upwards. It may also be possible to provide alternative types of actuator rather than the pyrotechnic actuator, such as a solenoid-based actuator. It is only important to ensure that the force generated by the actuator is sufficient to break the shear pin (if present) and any sticking of the cover to the missile body tube, as well as to push the cover upward into the airflow against any aerodynamic forces resulting from the motion of the missile, as has been described above. Other types of actuator may include self-locking devices to prevent movement in the absence of a signal, in which case it may not be necessary to include the shear pin as described above to hold the locking arms in position. Alternative forms of connector will also be possible, in particular inductive connections or other forms of connection that do not require a mechanical link between the missile and the cover mechanism.

Finally, it will be appreciated that the description of example embodiments and their applications provided above is intended to demonstrate a number of principles for the design and operation of such embodiments, both explicit and implied. The specific examples of functionality and features described may be applied in any reasonably foreseeable selection or combination consistent with those design principles, and the scope of the present invention as claimed below is intended to include all such selections and combinations.

The invention claimed is:

1. A cover for an intake of an air-breathing engine in a missile, the cover comprising a motive arrangement operable to move from a first configuration in which the cover is lockable to a missile, to a second configuration in which the cover is pushed outwardly from the missile; wherein in the first configuration the surface of the cover is flush with the surface of the missile and the motive arrangement is located inwardly of the cover surface;

wherein the motive arrangement comprises a linkage mechanism, the linkage mechanism, in the first configuration, being extended in a first direction such that the cover, in use, is locked onto the missile, and wherein, in the second configuration, the linkage mechanism is contracted in the first direction such that the cover is removable from the missile.

2. A cover as claimed in claim 1 wherein the motive arrangement comprises an actuator operable to move the motive arrangement from the first configuration to the second configuration.

3. A cover as claimed in claim 1 wherein the motive arrangement is configured, when moving from the first configuration to the second configuration, to move through an intermediate configuration in which the cover is removable from the missile but is not pushed outwardly from the missile.

4. A cover as claimed in claim 1 further comprising a hook structure arranged such that, when fitted to the air intake, the hook structure co-operates with a lip of the air intake so as to form a pivot about which the cover rotates as it is pushed outwardly from the missile.

5. A cover as claimed in claim 1 wherein the motive arrangement further comprises a cam and follower mechanism arranged to push the cover outwardly from the missile when the motive arrangement is moved to the second configuration.

6. A cover as claimed in claim 2 wherein the actuator comprises a linear actuator that is operable to extend in a second direction, so as to move the motive arrangement from the first configuration to the second configuration.

7. A cover as claimed in claim 6 wherein the motive arrangement further a cam and follower mechanism arranged to push the cover outwardly from the missile when the motive arrangement is moved to the second configuration and the cam comprises a sliding cam provided on the linear push rod on which a linear actuator operates.

8. A cover as claimed in claim 1 wherein the first direction is generally perpendicular to the second direction.

9. A cover as claimed in claim 6 wherein the second direction is generally parallel to a missile body tube of the missile.

10. A cover as claimed in claim 1, wherein the linkage mechanism comprises a locking arm arranged to retract in the first direction when the motive arrangement moves from the first configuration to the second configuration.

11. A cover as claimed in claim 1, further comprising a sealing ring arranged such that, when the cover is in place on the missile, the sealing ring is located around the intake so as to seal the intake from the external environment.

12. A cover as claimed in claim 2 further comprising means to hold the motive arrangement in the first configuration.

13. A cover as claimed in claim 12 wherein the motive arrangement comprises an actuator operable to move the motive arrangement from the first configuration to the second configuration and the means comprise a frangible shear pin configured to break on operation of the actuator.

14. A cover as claimed in claim 2 wherein the actuator is a pyrotechnic actuator.

15. A cover as claimed in claim 2 comprising means to receive a signal from the missile so as to cause operation of the actuator.

16. A cover as claimed in claim 1 further comprising a ballast weight arranged such that the centre of gravity of the cover is located towards the front of the cover.

17. A missile having an air-breathing engine and an intake for the air-breathing engine, the missile comprising a cover as claimed in claim 1 covering the intake, the cover being in the first configuration such that the surface of the cover is flush with the surface of the missile and the motive arrangement is located within the intake, wherein the cover is in communication with the missile such that, on receipt of a signal from the missile, the cover moves to the second configuration and is ejected from the missile.

18. A missile as claimed in claim 17 wherein the air intake is provided with means arranged to co-operate with the cover such that the cover can be locked to the missile in the first configuration.

19. A missile as claimed in claim 17, wherein the linkage mechanism comprises a locking arm arranged to retract in the first direction when the motive arrangement moves from the first configuration to the second configuration and the means comprise slots arranged to receive the locking arm.

* * * * *